United States Patent [19]
Ichihara

[11] Patent Number: 5,347,455
[45] Date of Patent: Sep. 13, 1994

[54] SCINTILLATION CAMERA

[75] Inventor: Takashi Ichihara, Ootawara, Japan

[73] Assignee: Kabushiki Kaisha Toshiba, Kawasaki, Japan

[21] Appl. No.: 139,812

[22] Filed: Oct. 22, 1993

[30] Foreign Application Priority Data

Oct. 23, 1992 [JP] Japan .................................. 4-285804

[51] Int. Cl.⁵ .............................................. G06F 15/42
[52] U.S. Cl. .................................. 364/413.24; 378/89
[58] Field of Search .......................... 364/413.24, 527; 378/87, 89; 250/363.1, 363.02, 363.04, 363.05

[56] References Cited

U.S. PATENT DOCUMENTS

| | | | |
|---|---|---|---|
| 4,415,982 | 11/1983 | Nishikawa | 364/527 |
| 4,563,583 | 1/1986 | Hattori | 250/363.1 |
| 4,733,082 | 3/1988 | Moore et al. | 250/363.02 |
| 4,858,151 | 8/1989 | Habara | 364/413.24 |
| 4,866,615 | 9/1989 | Ichihara | |
| 5,055,687 | 10/1991 | Ichihara | 250/363.02 |
| 5,227,968 | 7/1993 | Ichihara | |
| 5,245,191 | 9/1993 | Barber et al. | 250/363.1 |

FOREIGN PATENT DOCUMENTS

0125403 11/1984 European Pat. Off. ........ 364/413.24

OTHER PUBLICATIONS

Journal of Nuclear Medicine, vol. 29, 1988, pp. 195–202, Kenneth F. Koral, et al., "Spect Compt Scattering Correction by Analysis of Energy Spectra".

*Primary Examiner*—Donald E. McElheny, Jr.
*Attorney, Agent, or Firm*—Oblon, Spivak, McClelland, Maier & Neustadt

[57] ABSTRACT

A scintillation camera comprises a camera body for detecting a γ-ray emitted from radioisotope provided to a human body to be examined in a predetermined period of time, means for measuring an incident position of the γ-ray and its density based on the detection result of the camera body, and means for generating a density distribution of the γ-ray for every incident position based on the measurement result of the measuring means, thereby obtaining the density distribution of the γ-ray for every incident position.

15 Claims, 6 Drawing Sheets

SCINTILLATION CAMERA

BACKGROUND OF THE INVENTION

1. Field of the Invention

The present invention relates to a scintillation camera wherein a radioisotope (hereinafter called as "RI") is labeled by a medicine having a property concentrating on a specific internal organ and the medicine is supplied to a human body to be examined, and γ-rays emitted from RI at random are detected for a fixed period of time, thereby obtaining a distribution image of RI, i.e., a scintigram.

2. Description of the Related Art

A scintillation camera produces an image of the radioisotope distribution by detecting individual gamma rays or photons passing through a collimator and causing scintillation events in a scintillator in a detector. The scintillation caused by the gamma rays are provided to photomultipliers arrayed in the detector. Each photomultipliers provides a electrical signal dependent on the location of scintillation. Calculation circuit provides orthogonal (XY) coordinate signals and energy signal proportional to the energy level for each scintillation event from the signal outputs of photomultiplier. Compensating or calibration circuit compensates XY coordinate signals for non-linearity and energy signal for non-uniformity which the detector has. Window or pulse height analyzer circuit analyzes if the energy level of Z signal is within a predetermined energy window or width, so that only XYZ signals whose Z signal is within the predetermined energy width contribute to an image. Image memory accumulates a count at locations corresponding to XY signals, thereby, an image is obtained.

In a SPECT (Single Photon Emission Computed Tomography), further detector rotates around a human body to obtain radioisotope distributions of it from many directions. A conventional reconstruct technique reconstructs a tomogram image of radioisotope distribution from such radioisotope distributions obtained from many directions.

Gamma rays and photons cause Compton-scattering in the human body, collimator or scintillator. Detector detects both non-scattered and scattered gamma rays or photons. A conventional scintillation camera cannot remove the scattered gamma rays or photons from non-scattered ones sufficiently, in particular whose energy level is the same as the non-scattered. The scattered gamma rays or photons makes an image blurred.

K. F. Koral et al. "SPECT Compton-scattering correction by analysis of energy spectra, "J.Nucl.Med., vol. 29, pp. 195–202, 1988 discloses that scattered gamma rays or photons are estimated by energy spectrum obtained using a narrow energy window changeable along energy axis. However, in the method, it takes a long time to obtain energy spectrums for an image region and it is impossible to acquire energy spectrums for an image region at same time.

A multi-nuclide examination in which a plurality of energy-different RIs labeled by medicine having a different property are simultaneously provided to the object to be examined is useful for the quantitative examination of the function of the organ. In the multi-nuclide examination, the Z signal must be separated for each other. In conventional, the separation processing is performed by a plurality of different windows. Such a separation method is useful for only the time when the photoelectric peak between the nuclides is clearly separated on an energy axis. Therefore, such a separation method cannot be used in a case that the photoelectric peak between the nuclides is overlapped on the energy axis.

The above-mentioned energy spectrum includes much information, which is useful for the diagnosis. However, in the conventional scintillation camera, only a part of such information is used.

SUMMARY OF THE INVENTION

In consideration of the above problems, the present invention has been made, and an object of the present invention is to provide a scintillation camera, which can prepare an energy spectrum for every incident position of γ-rays.

According to the present invention, there is provided a scintillation camera comprising a camera body for detecting a γ-ray emitted from radioisotope provided to a human body to be examined; means for measuring an incident position of the γ-ray and its density based on the detection result of the camera body; and means for generating a density distributions of the γ-ray for every incident position based on the measurement result of the measuring means, thereby obtaining the density distributions of the γ-ray for every incident position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be explained with reference to the drawings.

Figure 1:
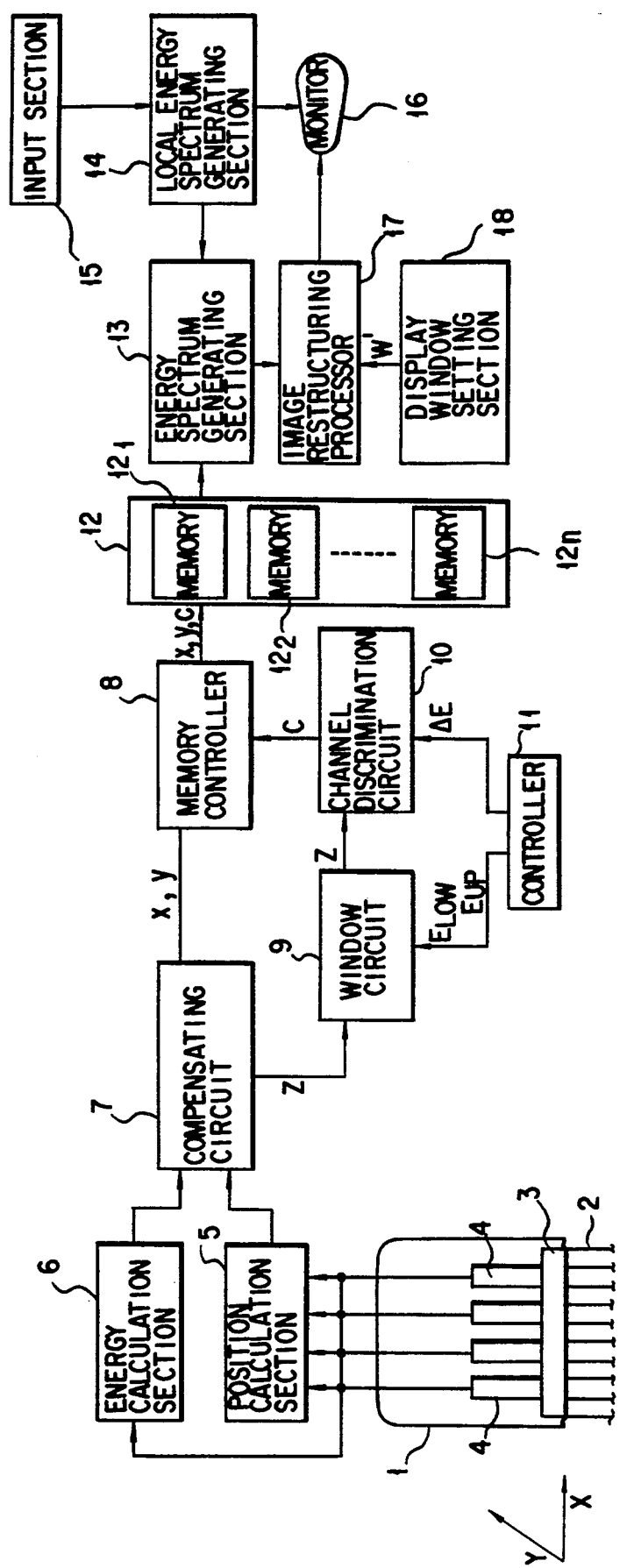
FIG. 1 is a block diagram of a first embodiment of the present invention.

FIG. 1 is a block diagram of a first embodiment of the present invention. A camber body 1 comprises a scintillator 3 using sodium iodide (NaI) for converting a γ-ray to a scintillation or visible light. A collimator 2 is provided at an incident surface of γ-ray of the scintillator 3 in a honeycombed shape. Each position of the incident surface of γ-ray is specified by an X-Y coordination. On a light output surface of the scintillator 3, a plurality of photomultipliers 4 are arranged in a matrix manner. A plurality of detection signals detected by the plurality of photomultipliers 4 are supplied to a position calculating section 5 and an energy calculating section 6.

The position calculating section 5 calculates an incident position of the γ-ray based on the comparison result between the detection signals, more specifically, the change of the detection signals along the respective X and Y directions. The position signal (hereinafter called as "xy signal" is provided to a compensating circuit 7. The energy calculating section 6 calculates y energy by adding all detection signals. The energy signal (hereinafter called as "Z signal") is provided to the compensating circuit 7.

The compensating circuit 7 compensates xy signals for non-linearity. Also, the compensating circuit 7 compensates z signal for non-linearity. The non-linearity and non-uniformity is a property peculiar to the camera body 1.

The compensated xy signals are provided to a memory controller 8, and the compensated Z signal is provided to a window circuit 9. The window circuit 9 selects only Z signal, which enters a window width W ($E_{LOW} \leq W \leq E_{UP}$) supplied from the controller 11. The window width W is provided to an energy band peculiar to the γ-ray emitted from RI (nuclide) provided to the object to be examined. The selected Z signal is provided to a channel discriminating circuit 10. The channel discriminating circuit 10 discriminates channel Cm ($1 \leq m \leq n$) in accordance with intensity of the Z signal. The channel is a number of a fine energy which is obtained by dividing the window width w by a fine pitch $\Delta E$. The fine pitch $\Delta E$ is supplied from the controller 11 to the channel discriminating circuit 10. The controller 11 sets the pitch $\Delta E$ to a value which an operator wishes. The channel Cm is sent to the memory controller 8.

The memory controller 8 controls a memory operation of a memory unit 12 in accordance with the channel Cm sent from the channel discriminating circuit 10 and the corresponding xy signal.

The memory unit 12 counts the Z signal, which is selected by the window circuit 9, for every xy signal and for every channel. In other words, the Z signal included in the same channel is counted for every incident position.

In the memory unit 12, n number of memories $12_l$ to $12_n$ for the number of channels are included. Each of the memories $12$ to $12_n$ has the coordinates of the γ-ray incident position, that is, the memory units for the number of pixels of the image in accordance with a space resolution of the position calculating section 5, which is determined by the design stage. Each memory unit corresponds to the xy signal. Every time when channel Cm is inputted to the memory controller 8, the counted value of the memory unit, which corresponds to the xy signal in the memory corresponding to the channel Cm, is counted up by +1.

An energy spectrum generating section 13 is connected to the memory unit 12. The energy spectrum generating section 13 generates an energy spectrum for every γ-ray incident position by use of the count value of the same xy coordinate of the memories $12_l$ to $12_n$. The energy spectrum is a distribution of density of γ-ray inputted into the camera body for a fixed period time. The energy spectrum is formed by distributing the count value of each channel along the energy axis.

A local energy spectrum generating section 14 is connected to the energy spectrum generating section 13. An input section 15 is connected to the local energy spectrum generating section 14. By the operation of the input section 15, a local area (interest area), which is formed of at least one pixel in scintigram the operator wishes, is set. The local energy spectrum generating section 14 adds the energy spectrums of all xy coordinates included in the interest area. Thereby, the energy spectrum relating to the interest area is generated. The size of the interest area set by the input section 15 is adjusted, so that an arbitrary energy spectrum including the energy spectrum of the single pixel to the energy spectrum of the interest area having an arbitrary size is generated. The generated energy spectrum is displayed on a monitor 16.

Moreover, an image restructuring processor 17 is connected to the energy spectrum generating section 13. The energy spectrums of all incident positions generated by the energy spectrum generating section 13 are supplied to the image restructuring processor 17. A display window width W' is supplied to the image restructuring processor 17 from a display window setting section 18. The display window width w' is set to be peculiar to the γ-ray emitted from RI provided to the object to be examined. Also, the display window width W' is set to be at least narrower than the display window width w of the window circuit 9. Then, the dispersion component is removed from a total count value (hereinafter called as "total area") of the channel entering the display window width w'. Thereby, a photoelectric peak area is counted. The energy spectrum is divided into two regions, i.e., upper and lower regions at a segment connecting two intersections of both ends of display window width W' and the energy spectrum. The upper region is a photoelectric peak component, and the lower region is a dispersion component. The photoelectric peak area of each energy spectrum of all incident positions is calculated. The scintigram in which the dispersion component using each pixel value as a photoelectric peak area is reduced is displayed on the monitor 16. Moreover, the image restructuring processor 17 performs the processing for separating the scintigram, which is obtained by the multi-nuclide examination, for ever RI.

An operation of the above embodiment will be explained.

Figure 2:
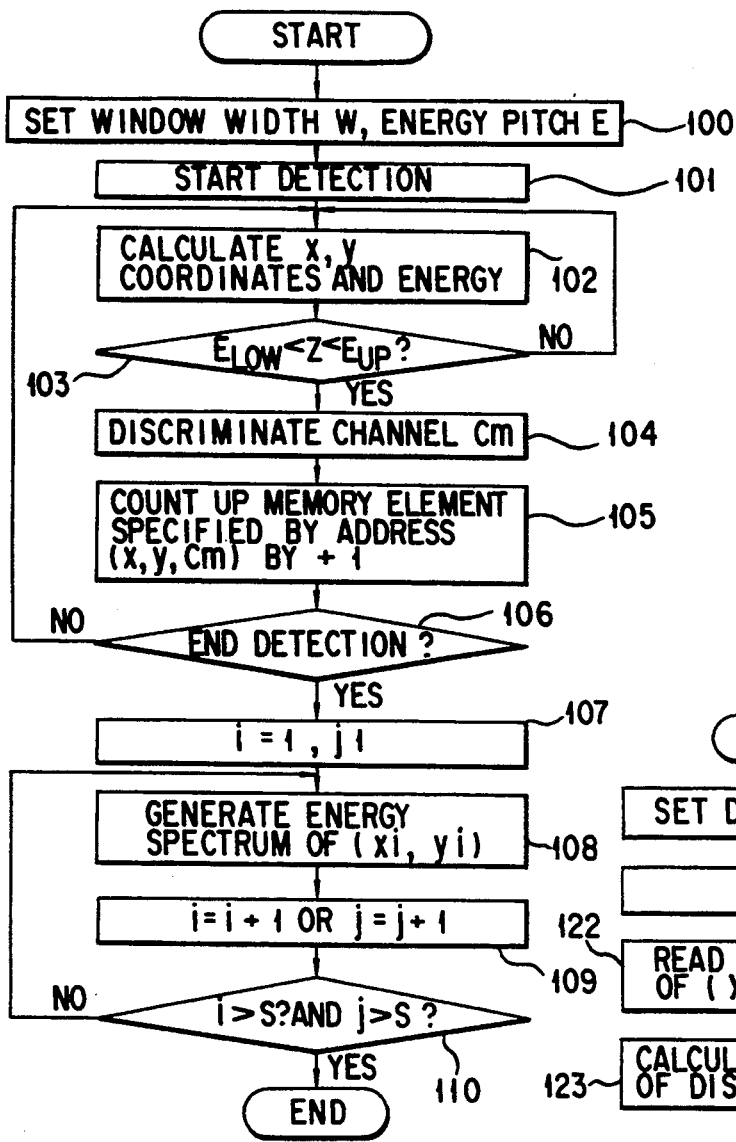
FIG. 2 is a flow chart showing the steps of generating an energy spectrum for every incident position of a γ-ray.

FIG. 2 is a flow chart showing the flow of processings including the start of detection to the generation of the spectrum for every incident position of the γ-ray. It is assumed that the number of coordinates of the incident position of the γ-ray, which is calculated by the position calculating section 5, that is, the number of pixels of the scintigrams is S×S matrix.

In step 100, the window width W, which includes all areas of the γ-ray energy emitted from the nuclides A, B and C, is set to the window circuit 9 by the controller 11. Also, in step 100, an energy pitch ΔE is set to the channel discriminating circuit 10 by the controller 11. It is assumed that the number of fine energy bands, which is obtained by dividing the window width W by the distance of energy pitch ΔE, that is, the number of channels is n. For setting the window width W, the operator may arbitrarily input the window width W to the controller 11. Or, it is possible to hold a plurality of the window widths for every RI in the built-in memory of the controller 11, and automatically set the window width W based on the window width corresponding to RI selected by the single nuclide examination or the multi-nuclide examination.

A series of processings including steps 101 to 106 is a detection processing of the γ-ray emitted from RI in the object to be examined. The period of time of continuing this processing is set to be constant in advance. It is of course that the memory unit 12 is reset to zero in starting the detection.

In step 102, an xy coordinate is calculated for every γ-ray incidence by the position calculating section 5. Moreover, energy is calculated for every γ-ray incidence by the energy calculating section 6. In terms of linearity, an xy signal is compensated by the compensating circuit 7, a Z signal is compensated in terms of energy. The compensated xy signal is sent to the memory controller 7, and the compensated Z signal is sent to the window circuit 9.

In step 103, the window circuit 9 selects only the Z signal, which enters the window width w ($E_{LOW} \leq W \leq E_{UP}$) sent from the controller 11. The non-selected Z signal is destroyed, and the processing goes back to the step 101, and the operator stands by a next γ-ray incidence.

In step 104, the channel discriminating circuit 10 discriminates channel Cm ($1 \leq m \leq n$) corresponding to density of the Z signal. The channel Cm is sent to the memory controller 8.

In step 105, address signals (x, y, Cm) are outputted to the memory unit 12 from the memory controller 7. Thereby, the Z signal, which is selected by the window circuit 9, is counted for every xy signals or for every channel. In other words, the Z signal included in the same channel is counted for every incident position. That is, the count value of the memory unit, which is specified by the xy signal in the memory corresponding to the channel Cm, is counted up by one. A series of processings including steps 102 to 105 is continued till the discrimination is YES in step 106 after the examination is started and a fixed period of time is passed. At the time of the end of the detection, n number of energy images having a different energy band is stored in each of memories $12_l$ to $12_n$ of the memory unit 12.

A series of processings including steps 107 to 111 is the processing, which is performed by the energy spectrum generating section 13, that is, the processing for generating the energy spectrum for every incident position of the γ-ray. In step 107, parameters i and j are set to 1. The parameters i and j are used to specify the xy coordinate of each of memories $12_l$ to $12_n$.

Figure 3:
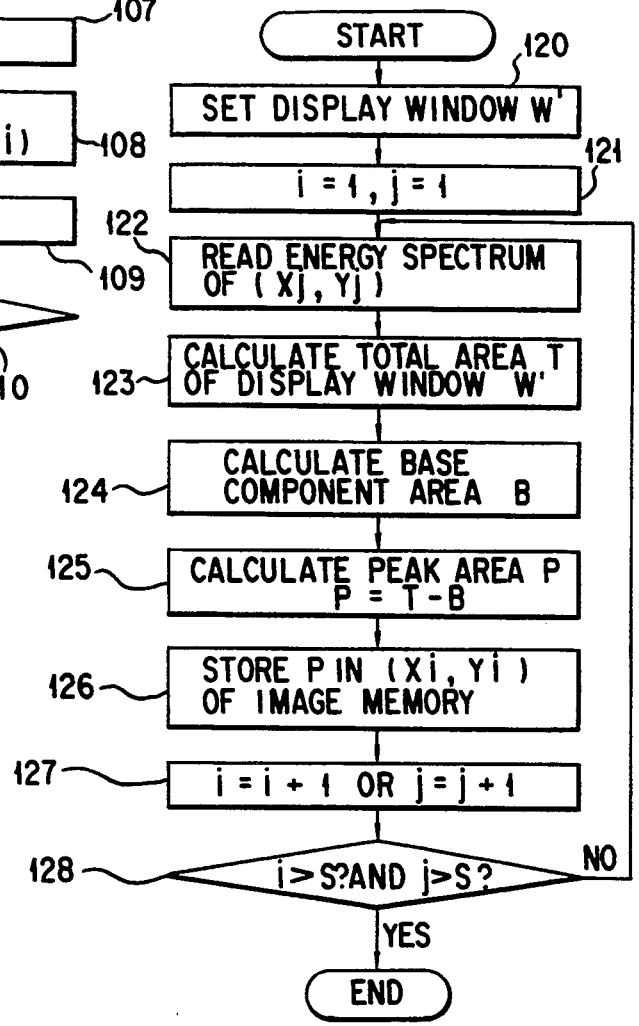
FIG. 3 is a flow chart showing the steps of removing a dispersion component for every incident position of the γ-ray.

In step 108, n number of count values stored in the n number of memory units specified by the xy coordinate (xi, yj) of the memory $12_l$ to $12_n$ is distributed along the energy axis. Thereby, as shown in FIG. 3, energy spectrum of the xy coordinate (xi, yj) is generated. It is of course that the xy coordinate corresponds to the incident position of the γ-ray.

In step 109, only 1 is added to parameter i or j to prepare the generation of the energy spectrum of the next incident position of the γ-ray. In step 110, it is discriminated whether or not one of the parameters i and j to which 1 is added exceeds S. If it is NO, the main processing is returned to step 108. If it is YES, that is, the generation of the energy spectrum of all incident positions is completed, this processing is ended.

By the above-mentioned processings, the scintillation camera of the embodiment of the present invention can generate the energy spectrum for every incident position of the γ-ray. The following will explain the application of the energy spectrum generated for every incident position of the γ-ray.

A first application relates to the display of the energy spectrum. According to the first application, a local energy spectrum of an arbitrary interest area (local) in the scintigram is displayed. The operator operates the input section 15 to set the interest area having an arbitrary size at an arbitrary position in the scintigram. It is of course that the scintigram may be one pixel. In this case, the energy spectrum generated by the energy spectrum generating section 13 is passed through the local energy spectrum generating section 14, and directly displayed on the monitor 16. In a case that the interest area includes a plurality of pixels, in the local energy spectrum generating section 14, the positions of the plurality of energy spectrums, which correspond to the xy coordinates of all pixels included in the interest area, are shaped, and added. Thereby, a new energy spectrum of the interest area is generated. The new energy spectrum is displayed on the monitor 16.

Figure 4:
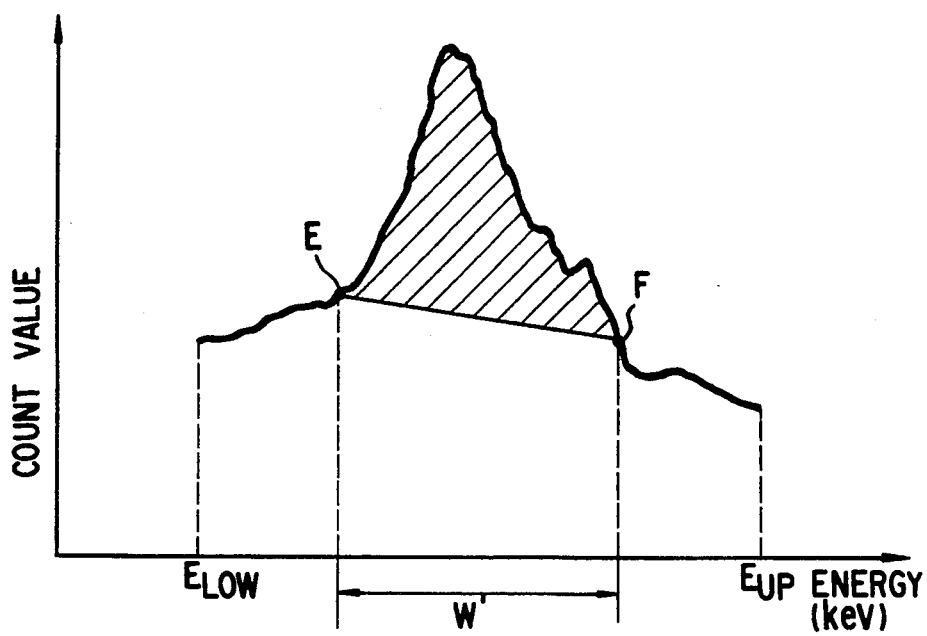
FIG. 4 is a view showing an energy spectrum relating to one incident position of the γ-ray.

A second application relates to the removal of the dispersion component. FIG. 3 is a flow chart showing the steps of removing the dispersion component. FIG. 4 is a view showing the energy spectrum of one incident position of the γ-ray. In step 120, the display window width W' peculiar to the γ-ray, which is emitted from the RI provided to the object to be examined from the display window setting section 18, is set to the image restructuring processor 17. The display window width W' may be set manually with reference to the energy spectrum. Or, the display window width W' may be automatically set with a width of 20% of energy showing the photoelectric peak of the γ-ray emitted from RI. In step 121, the parameters i and j are set to 1. In step 122, the energy spectrum of the incident position of the γ-ray (xi, yj) is read to the image restructuring processor 17 from the energy spectrum generating section 13.

In step 123, the count value of the display window W' is integrated, and the total area T is calculated. In step 124, the base component area B including many dispersion components is calculated. As mentioned above, a segment E-F, which connects two intersections E and F of both ends of the display window width w' and the energy spectrum, is drawn to the energy spectrum. The energy spectrum is divided into two regions, i.e., upper and lower regions at the segment E-F. The upper region, which is shown by slanting lines, is the photoelectric peak component, and the lower region is the dispersion component. The base component area B is the area of the lower region.

In step 125, the base component area B is subtracted from the total area T. Thereby, the photoelectric peak area P having the photoelectric peak component shown by slanting lines of FIG. 4 is calculated. In step 126, the photoelectric peak area P is stored at the position of (Xi, Yj) of the image memory of the image restructuring processor 17. In step 127, the parameter i or j is added by only 1. In step 128, a series of processings including 122 to 127 is repeated until the discrimination of YES can be obtained, that is, the photoelectric peak area of all incident positions is calculated. Therefore, the scintigram in which each pixel value is the photoelectric peak area is displayed in the monitor 16 as the scintigram in which the dispersion component is reduced for every incident position of the γ-ray. Unlike the prior art, in the second application, there is no need that the mixing rate of the dispersion component is measured for every incident position of the γ-ray. Moreover, the removal of the dispersion component can be correctly realized.

Figure 5:
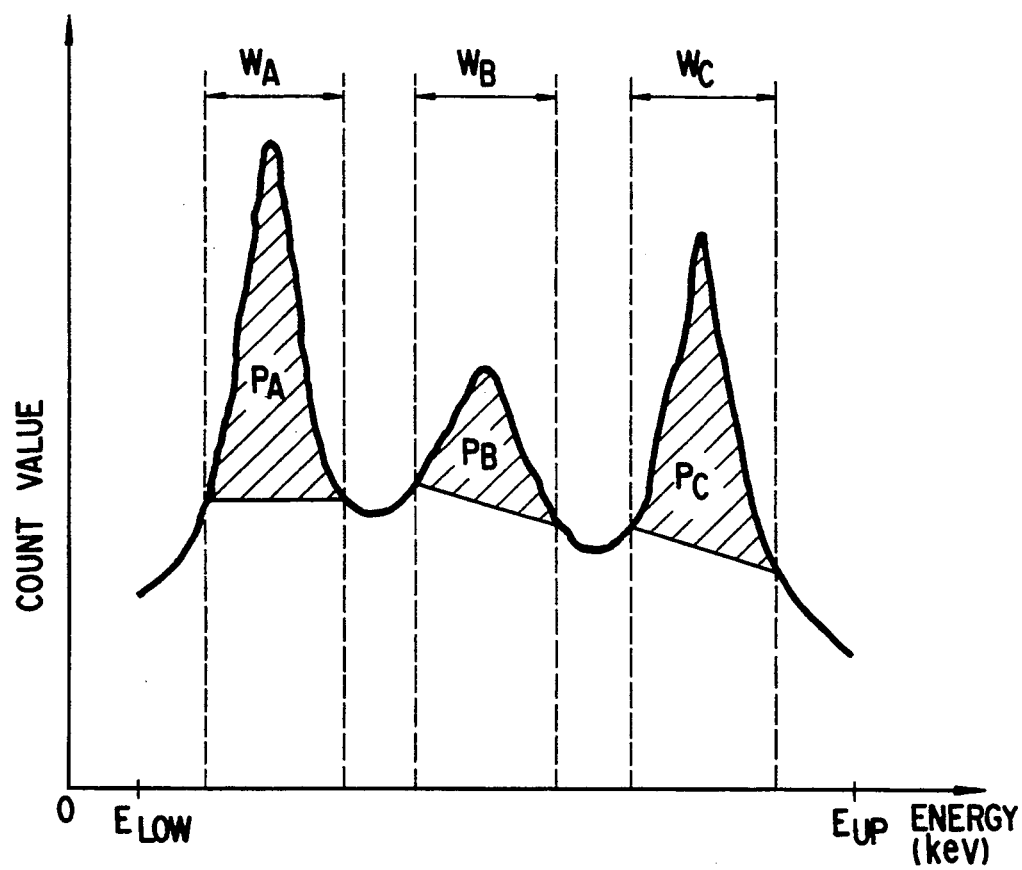
FIG. 5 is a view showing an energy spectrum relating to one incident position of the γ-ray in a multi-nuclide examination.

The above application can be used in the multi-nuclide examination in which the plurality of types of RIs labeled by the medicine having a different property are simultaneously provided. In the plurality of RIs used in the multi-nuclide examination of this application, the space between energy showing each photoelectric peak is sufficiently separated. FIG. 5 is a view showing the energy spectrum of one incident position of the γ-ray in the multi-nuclide examination using three types of RIs A, B, and C. The processing of this case is the same as that of FIG. 3 excepting that the display window width is set to WA, WB, WC for every RI.

A third application relates to the removal of the dispersion component in the multi-nuclide examination and the separation of the scintigram for every RI. In this application, the energy showing each photoelectric peak of the plurality of types of RIs used in the multi-nuclide examination extremely approaches on the energy axis, and the scintigram can be separated for every RI even if the display window widths are overlapped on each other. As such a multi-nuclide, Tc-99m (photoelectric peak energy: 141 KeV) and I-123 (photoelectric peak energy: 159 KeV) are typically used. The following will explain the use of such multi-nuclide.

Figures 6, 9:
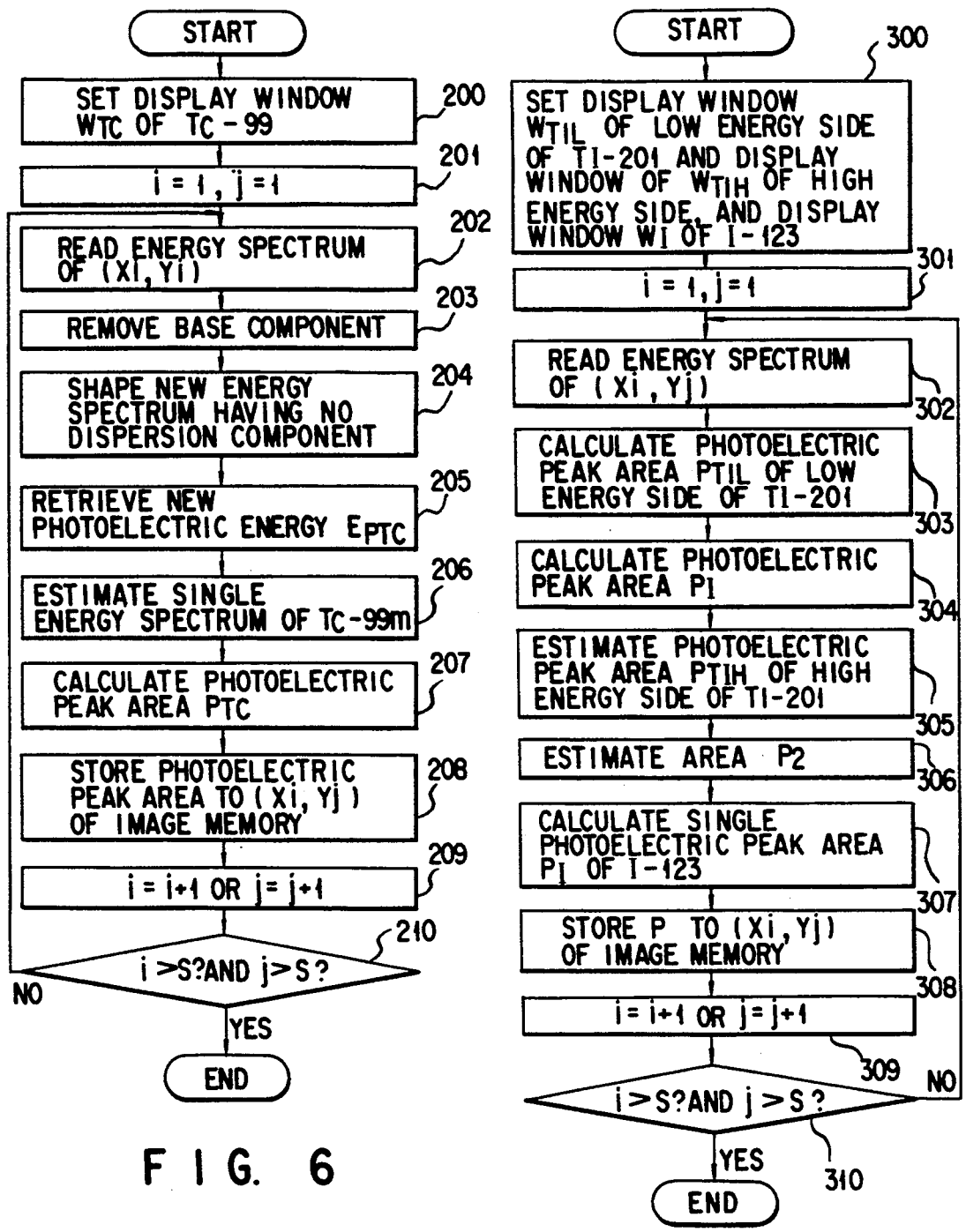
FIG. 6 is a flow chart showing the steps of separating a scintigram in the multi-nuclide examination for every RI.
FIG. 9 is a flow chart showing the steps of separating the scintigram in the multi-nuclide examination for every RI.
Figure 7:
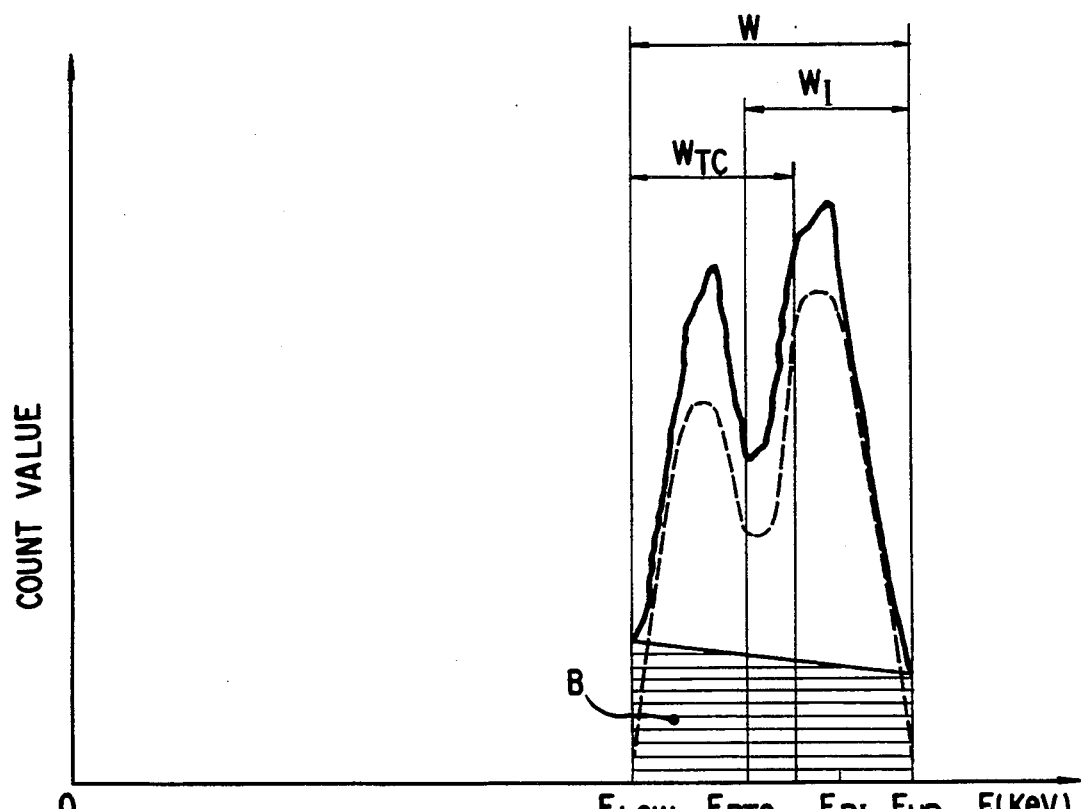
FIG. 7 is a view showing an energy spectrum of one incident position of the γ-ray in the multi-nuclide examination of FIG. 6.
Figure 8:
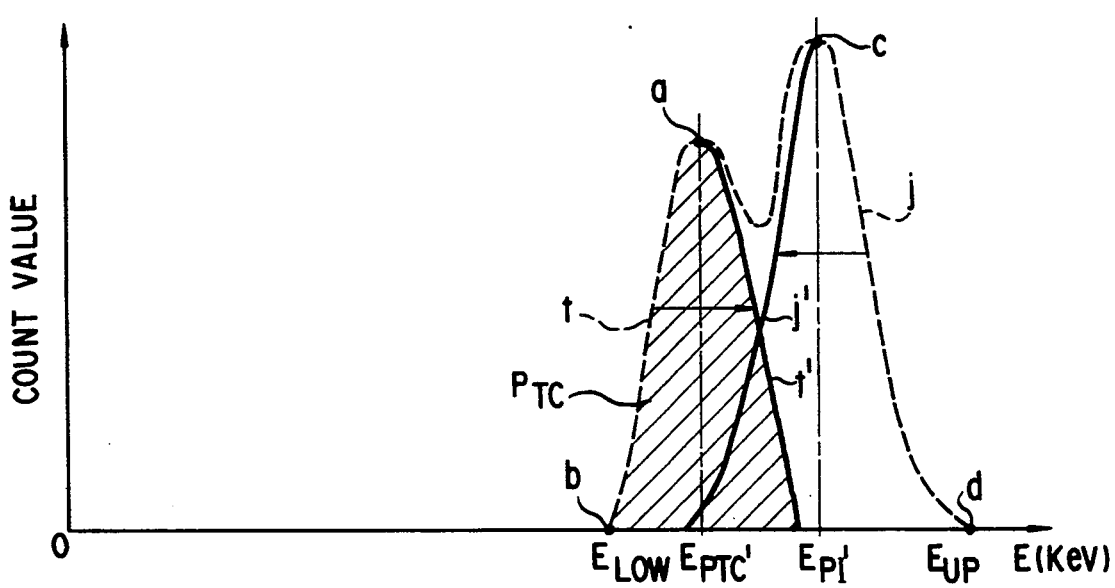
FIG. 8 is a view showing an energy spectrum in which a base component of FIG. 7 is removed.

FIG. 6 is a flow chart showing the flow of the processing of the third application. FIG. 7 shows the energy spectrum of one incident position of the γ-ray. In step 200, the display window setting section 18 sets display window widths $W_{TC}$ and $w_I$ of Tc-99m and I-123 in the image restructuring processor 17. These display window widths $W_{TC}$ and $w_I$ are partially overlapped, and the entire display window width W is formed. In step 201, the parameters i and j are set to initial value of 1. In step 202, the energy spectrum of the γ-ray incident position (xi, yj) is read from the energy spectrum generating section 13 to the image restructuring processor 17. In step 203, the base component B is removed from the energy spectrum. Since the explanation of the processing of removing the base component B will be omitted since it was explained by use of FIG. 4 in the second application. In step 204, a new energy spectrum in which the base component B is removed is shaped. FIG. 8 shows the new energy spectrum.

In step 205, the photoelectric peak energy $E_{PTc'}$ of Tc-99m of the new energy spectrum is retrieved. In step 206, a curve t, which is from points a to b on the lower energy side than the photoelectric peak energy $E_{PTc'}$, is returned to the high energy side to sandwich the photoelectric peak energy $E_{PTc'}$ between the curve t and a returned curve t'. The returned curve t' is connected to the original curve t. Thereby, the single energy spectrum of Tc-99m can be estimated. The energy spectrum is symmetrical about the photoelectric peak energy when the dispersion component is not included in the energy spectrum. In consideration of this property, it is understandable that the energy spectrum generated by the above connection extremely approximates the energy spectrum obtained by the single examination of Tc-99m.

In step 207, each count value of the energy spectrum generated by the above connection is integrated, so that the photoelectric peak area $P_{Tc}$ of Tc-99m, which is shown by the slanting lines, is calculated. In step 208, the photoelectric peak area $P_{Tc}$ is stored in (xi, xj) of the image memory of the image restructuring processor 17. It is of course that the photoelectric peak area $P_{Tc}$ may be obtained by doubling the area value of the new energy spectrum included in the range from $E_{LOW}$ to $E_{PTc'}$.

In connection with all incident positions, a series of the processings including steps 202 to 208 is repeated, and the photoelectric peak area of each incident position of Tc-99m is calculated. The scintigram in which each pixel value is the photoelectric peak area is displayed on the monitor 16 as a single scintigram of Tc-99m in which the dispersion component is reduced for every γ-ray incident position.

The photoelectric peak area of Tc-99m calculated by the above processing is subtracted from the area value of the energy spectrum included in the entire display window width W. The scintigram of I-123 may be obtained by repeating such a subtraction for every γ-ray incident position. Or, the scintigram of I-123 may be obtained by executing the above-mentioned processing by use of the display window width of I-123.

In the above third application, the energy showing each photoelectric peak of the plurality of types of RIs used in the multi-nuclide examination extremely approaches on the energy axis, and the scintigram can be separated for every RI even if the display window widths are overlapped on each other.

Figure 10:
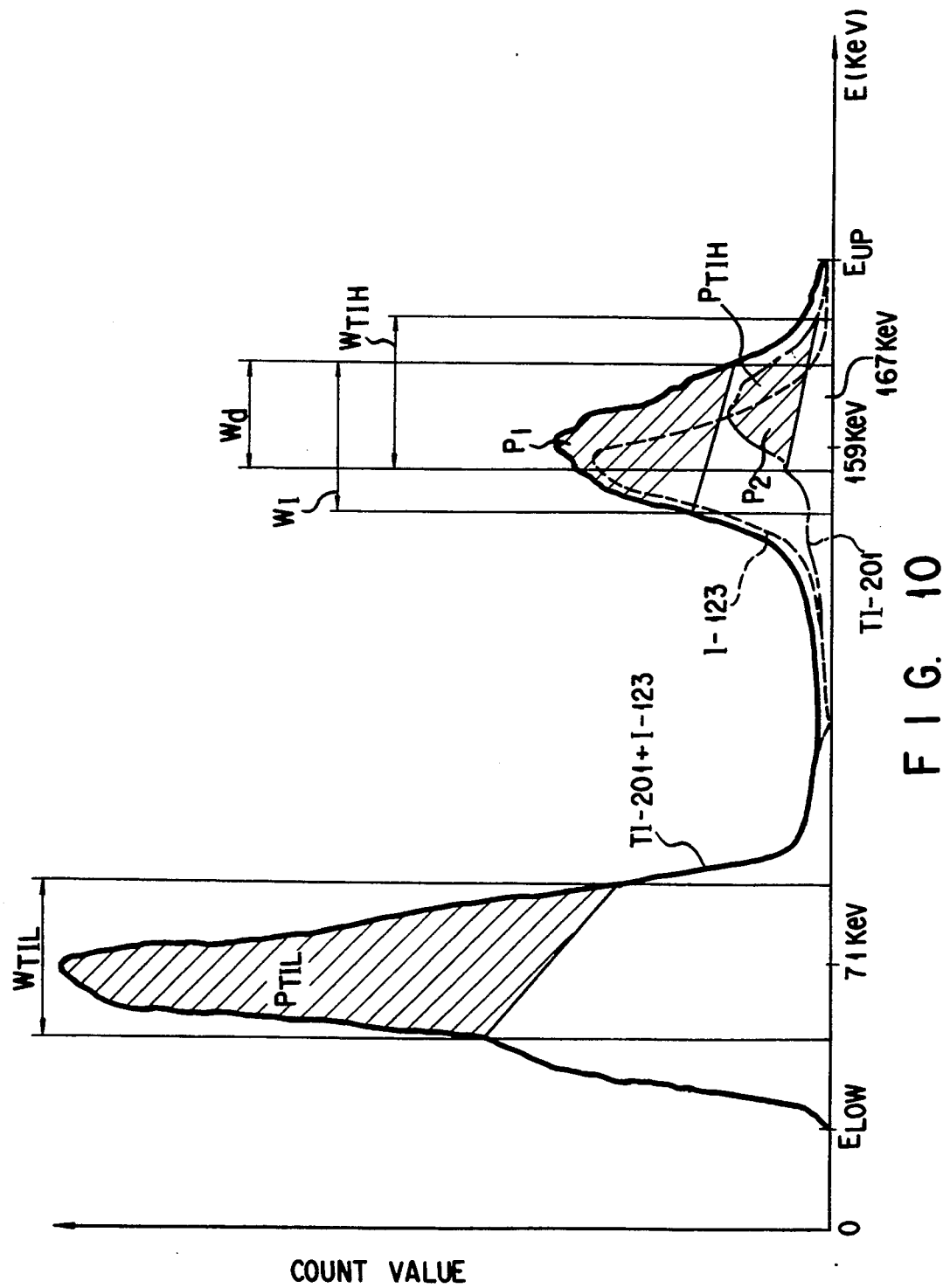
FIG. 10 is a view showing an energy spectrum of one incident position of the γ-ray in the multi-nuclide examination of FIG. 9.

A fourth application relates to the removal of the dispersion component, and the separation of the scintigram for every RI in the multi-nuclide examination in which one RI having two or more photoelectric peak energy and the other RI having photoelectric peak energy close to the photoelectric peak energy of one RI. For example, T1-201 (photoelectric peak energy: 71 KeV and 167 KeV) is used as one RI having two or more photoelectric peak energy, and I-123 (photoelectric peak energy: 159 KeV) is used as other RI. The above example will be explained as follows:

FIG. 9 is a flow chart showing the processing of the fourth application. FIG. 10 shows the energy spectrum of one incident position of the γ-ray. In step 300, the display window setting section 18 sets a display window $W_{T1L}$ of the low energy side corresponding to the two photoelectric peaks of T1-201, a display window $W_{T1H}$ of the high energy side, and a display width $W_I$ of I-123 in the image restructuring processor 17. In step 302 through step 301, the energy spectrum of (xi, yj) is read to the image restructuring processing 17 from the energy spectrum generating section 13.

In step 303, a photoelectric peak area $P_{T1L}$ of the display window $W_{T1L}$ of the low energy side of T1-201 is calculated. The calculating method of the photoelectric peak area is the same as the steps 123 to 125 of FIG. 3.

In step 304, a photoelectric peak area $P_{TIL}$ of the display window $W_I$ of T-123 is calculated. In the photoelectric peak area $P_1$, the component of the high energy side of T1-201 is mixed. In the fourth application, the mixed component is removed, and the single photoelectric peak area of I-123 is calculated. Due to this, in step 305, the photoelectric peak area $P_{TIH}$ of the high energy side of T1-201 is estimated from the photoelectric peak area $P_{TIL}$ of the low energy side of the same T1-201 based on γ-ray emitting rate and disintegration rate between two energy. The γ-ray emitting rate of the photoelectric peak energy (167 KeV) of the high energy side to the photoelectric peak energy (71 KeV) of the low energy side of T1-201 is 11%, which is well-known, and the disintegration rate is 96%, which is well-known. Therefore, the photoelectric peak area $P_{TIH}$ of the high energy side of T1-201 can be estimated from the following equation (1) based on the photoelectric peak area $P_{TIL}$ of the low energy side of T1-201, the γ-ray emitting rate and disintegration rate.

$$P_{TIH} = P_{TIL} \times 0.11 \times 0.96 \tag{1}$$

In step 306, it is assumed that the area $P_2$ of the portion, which is included in the display window $W_I$, is to the photoelectric peak area $P_{TIH}$ of the high energy side of T1-201 what the display window $W_d$ where $W_{TIH}$ and $W_I$ are overlapped is to the display window $W_{TIH}$ of the high energy side of T1-201 ($W_R/W_T = P_2/P_{TIH}$), $P_2$ can be obtained by the following equation (2).

$$P_2 = P_{TIH} \cdot W_R / W_{TIH} \tag{2}$$

In step 307, the single photoelectric peak area $P_I$ of I-123, which does not contain the dispersion component and T1-201 component, is calculated by subtracting the area $P_2$ from the area $P_1$.

A series of processings including steps 302 to 307 is repeated in connection with all incident positions. Then, all incident positions of the single photoelectric peak area PI of I-123, which does not contain the dispersion component and T1-201 component, are calculated. The scintigram in which each pixel value is the photoelectric peak area is displayed on the monitor 16 as a single scintigram of I-123 in which the dispersion component is reduced for every γ-ray incident position and no T1-201 component is contained.

According to the fourth application, in the multinuclide examination in which one RI having two or more photoelectric peak energy and the other RI having photoelectric peak energy close to the photoelectric peak energy of one RI, the removal of the dispersion component, and the separation of the scintigram for every RI can be realized.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A scintillation camera comprising:
    a camera body for detecting a γ-ray emitted from a radioisotope provided to a human body to be examined;
    means for measuring an incident position of the γ-ray and its density based on the detection result of said camera body; and
    means for generating a density distributions of the γ-ray for every incident position based on the measurement result of said measuring means, thereby obtaining the density distributions of the γ-ray for every incident position.

2. The scintillation camera according to claim 1, wherein said camera body comprises converting means for converting light to a γ-ray, and a plurality of photoelectric converting means, provided on a light outputting surface of said converting means in a matrix manner, for detecting said light, said measuring means measures said incident position based on the comparative result between detection signals of said plurality of photoelectric converting means, and measures said density by adding all detection signals of said plurality of photoelectric converting means.

3. The scintillation camera according to claim 1, wherein said generating means comprises means for counting a number of incidences of γ-ray to said camera body for every incident position and for every density, and means for generating said density distribution by distributing all count values of the same incident positions along a density axis.

4. The scintillation camera according to claim 3, wherein said counting means comprises storing means having a plurality of memory units each corresponding to a peculiar incident position and peculiar density, means for counting up a memory value of the memory unit corresponding to the γ-ray incident position and density every time when the γ-ray is incident by one.

5. The scintillation camera according to claim 4, wherein said storing means is a plurality of memories having memory units for the number of incident positions measurable by said measuring means, and corresponding to a different density.

6. The scintillation camera according to claim 1, further comprising means for constructing a scintigram by use of all density distributions; and
    means for displaying said scintigram.

7. The scintillation camera according to claim 6, wherein said generating means comprises means for counting the number of incidences of Y-ray to said camera body for every incident position and for every density, and means for generating said density distribution by distributing all count values of the same incident positions along a density axis; and
    said constructing means obtains total values of the count values in a predetermined density region for every density distribution such that each total value is set as each pixel value of said scintigram.

8. The scintillation camera according to claim 7, wherein said constructing means subtracts the number of dispersion from said total value so as to remove a dispersion component from said scintigram for every incident position.

9. The scintillation camera according to claim 8, wherein said constructing means obtains said number of dispersion based on the count value corresponding to density of both ends of said density region in each density distribution for every incident position.

10. The scintillation camera according to claim 7, wherein an examination in which a plurality of types of radioisotopes having a different peak density showing the maximum count value included in said density region are simultaneously provided to the human body to be examined, said constructing means separates said scintigram by individually using the density distribution for every type of the radioisotope.

11. The scintillation camera according to claim 10, wherein said constructing means removes the dispersion component from each density distribution, returns a distribution curve, which is from the density of one end of said density region to said one peak density, to an opposite side to density of said one end at a point of said one peak density as a center, and connects said distribution curve to said returned distribution curve, so that a new density distribution for only one radioisotope is generated every incident position, and each adding value of the count value of the new density distribution is set as each pixel value of the scintigram for only one radioisotope.

12. The scintillation camera according to claim 11, wherein said constructing means removes the dispersion component from each density distribution, returns a distribution curve, which is from the density of other end of said density region to said other peak density, to an opposite side to density of said one end at a point of said other peak density as a center, and connects said distribution curve to said returned distribution curve, so that a new density distribution for only one radioisotope is generated every incident position, and each adding value of the count value of the new density distribution is set as each pixel value of the scintigram for only the other radioisotope.

13. The scintillation camera according to claim 11, wherein said constructing means subtracts said adding value of the same density distribution from each total value of the count value of all region of said density region in each density distribution to obtain each subtraction value as each pixel value of the scintigram for only the other radioisotope.

14. The scintillation camera according to claim 7, wherein, in the multi-nuclide examination in which a first radioisotope having different two types of photoelectric peak densities and a second radioisotope having a peak density close to one of said two peak densities are provided to the object to be examined, said constructing means estimates the adding value of the count value of the intensity band including one peak density of said first radioisotope for every $\gamma$-ray incident position from the adding value of the count value of the intensity band including other peak density of said first radioisotope based on a $\gamma$-ray emitting rate of the other peak density to one peak density of said first radioisotope and a disintegration rate, and the total value of the estimated adding value and the adding value of the count value of the density band including said other peak density is set as each pixel value of the scintigram for only said first radioisotope.

15. The scintillation camera according to claim 14, wherein said constructing means sets each subtraction value, obtained by subtracting said estimated adding value from the adding value of the count value of the density band including other peak density of said first radioisotope and the peak density of said second radioisotope close to the other peak density, as each pixel value of the scintigram for only said second radioisotope.

* * * * *